(12) United States Patent
Ham (10) Patent No.: US 11,747,835 B2
(45) Date of Patent: Sep. 5, 2023

(54) SELF-POWERED REMOTE CONTROL SYSTEM FOR SMART VALVE

(71) Applicant: DHECO ENERGY, Sejong (KR)

(72) Inventor: Young Hwan Ham, Cheongju-si (KR)

(73) Assignee: DONGHAE ECO ENERGY LTD., Sejong (KR)

(*) Notice: Subject to any disclaimer, the term of this patent is extended or adjusted under 35 U.S.C. 154(b) by 0 days.

(21) Appl. No.: 17/634,428

(22) PCT Filed: Dec. 3, 2019

(86) PCT No.: PCT/KR2019/016822
§ 371 (c)(1),
(2) Date: Feb. 10, 2022

(87) PCT Pub. No.: WO2021/029496
PCT Pub. Date: Feb. 18, 2021

(65) Prior Publication Data
US 2022/0317709 A1 Oct. 6, 2022

(30) Foreign Application Priority Data
Aug. 12, 2019 (KR) .......... 10-2019-0098014

(51) Int. Cl.
*G05D 7/06* (2006.01)
*F03B 3/12* (2006.01)
*F03B 13/08* (2006.01)

(52) U.S. Cl.
CPC .......... *G05D 7/0635* (2013.01); *F03B 3/121* (2013.01); *F03B 13/08* (2013.01); *F05B 2240/12* (2013.01);
(Continued)

(58) Field of Classification Search
CPC ....... G05D 7/0635; F03B 3/121; F03B 13/08; F05B 2240/12; F05B 2250/232
(Continued)

(56) References Cited
U.S. PATENT DOCUMENTS 2,896,544 A * 7/1959 Ogles .................. F04D 9/04
415/143
3,144,768 A * 8/1964 Gehre .................. G01F 1/06
73/861.33
(Continued)

FOREIGN PATENT DOCUMENTS

JP 2008-261249 A 10/2008
JP 4597733 B2 12/2010
(Continued)

*Primary Examiner* — William M McCalister
(74) *Attorney, Agent, or Firm* — NKL Law; Jae Youn Kim (57) ABSTRACT

The present invention relates to a self-powered remote control system for a smart valve, the system comprising: a smart valve for regulating the flow of a fluid in a pipe; a sensing module for sensing the flow rate, pressure, and temperature of the fluid in the pipe; a power generation module for generating power according to the flow of the fluid; a control module for controlling the lifting or lowering of the opening/closing plate of the smart valve according to the flow rate, pressure, or temperature state sensed by the sensing module; and an administrator terminal for transmitting and receiving control signals to and from the control module, wherein the power generation module comprises: a conical fluid guide member provided in a direction in which the fluid is supplied; and a rotating member rotated by the fluid guided through the fluid guide member, whereby the operation of the smart valve can be controlled by manipulating the administrator terminal at a remote location, so as to supply the fluid into the pipe or intercept the supply of the fluid into the pipe.

3 Claims, 9 Drawing Sheets

(52) U.S. Cl.
CPC ... *F05B 2250/232* (2013.01); *F05B 2270/301* (2013.01); *F05B 2270/303* (2013.01); *F05B 2270/341* (2020.08)

(58) Field of Classification Search
USPC ....... 73/1.27, 1.28, 861.32, 861.33, 861.353; 415/143
See application file for complete search history.

(56) References Cited

U.S. PATENT DOCUMENTS

| | | | | |
|---|---|---|---|---|
| 3,447,373 A * | 6/1969 | Mcnabb | ................... | G01F 1/20 73/253 |
| 3,806,278 A * | 4/1974 | Grennan | ............ | F04D 15/0038 416/177 |
| 3,898,883 A * | 8/1975 | Kozak | ...................... | G01F 1/10 73/861.92 |
| 4,248,099 A * | 2/1981 | Allen, Jr. | ................... | G01F 1/82 73/861.353 |
| 4,345,875 A * | 8/1982 | Charpentier | ............. | F03B 3/00 415/143 |
| 4,438,648 A * | 3/1984 | Cheney, Jr. | ............... | G01F 1/00 73/195 |
| 4,456,424 A * | 6/1984 | Araoka | ................... | F04D 7/045 415/121.2 |
| 4,561,312 A * | 12/1985 | Roy | .......................... | G01F 1/07 73/861.79 |
| 5,003,828 A * | 4/1991 | van den Burg | ......... | G01F 1/103 73/861.89 |
| 5,139,391 A * | 8/1992 | Carrouset | ................ | B63H 5/14 416/177 |
| 5,226,329 A * | 7/1993 | Peters | ..................... | G01F 1/103 73/861.79 |
| 5,251,815 A * | 10/1993 | Foye | ....................... | F24F 13/06 236/51 |
| 5,327,788 A * | 7/1994 | Hoppe | ...................... | G01F 1/32 73/253 |
| 5,341,686 A * | 8/1994 | Chai | ......................... | G01F 1/06 73/861.79 |
| 5,370,001 A * | 12/1994 | LaBrecque | ............... | G01F 1/82 73/861.353 |
| 5,388,466 A * | 2/1995 | Teunissen | ................. | G01P 5/07 73/861.77 |
| 5,768,883 A * | 6/1998 | Mayer | ....................... | F02C 9/32 137/83 |
| 6,776,055 B2 * | 8/2004 | Burton | ...................... | G01F 1/82 73/861.77 |
| 8,579,575 B2 * | 11/2013 | Lu | .............................. | F03D 9/11 415/4.1 |
| 2005/0097969 A1* | 5/2005 | Gadini | .................. | G01F 15/006 73/861.33 |
| 2011/0305557 A1* | 12/2011 | Lu | .............................. | F03D 9/25 290/55 |
| 2014/0346776 A1* | 11/2014 | Park | ........................ | F01D 15/10 290/52 |
| 2020/0015438 A1* | 1/2020 | Klicpera | .............. | A01G 25/165 |

FOREIGN PATENT DOCUMENTS

| | | |
|---|---|---|
| KR | 10-1187875 B1 | 10/2012 |
| KR | 10-1245450 B1 | 3/2013 |
| KR | 10-1465584 B1 | 11/2014 |
| KR | 10-1563464 B1 | 10/2015 |
| KR | 10-2019-0023430 A | 3/2019 |
| KR | 10-1937990 B1 | 4/2019 |

* cited by examiner

SELF-POWERED REMOTE CONTROL SYSTEM FOR SMART VALVE

TECHNICAL FIELD

The present invention relates to a self-powered remote control system for a smart valve, which performs small hydroelectric power generation using water flowing in a pipe to generate self-powered energy using a water flow rate of 1.2 Mpa to 1.4 Mpa in a multipurpose waterway, a reservoir, a water and sewer facility, or a skyscraper system so as to allow wireless communication for sensor data (about a temperature, pressure, or flow rate) and remote control, and more particularly, to a self-powered remote control system for a smart valve, in which power is generated according to a flow of a fluid in a pipe, and data is detected from a temperature, pressure, or flow rate sensor and a camera module so as to remotely control a state of the pipe.

BACKGROUND ART

In general, hydropower is green and clean energy that harmonizes with natural regional conditions and is evaluated as a natural resource that is prepared for environmental pollution regulations and is suitable for local distributed power generation. A hydroelectric power generation system for generating power using a head drop of water falling from a high place and a small hydroelectric power generation system for collecting water discarded from buildings in one place, draining the collected water with a significant head drop to obtain energy, and rotating a water wheel with the obtained energy to generate power are known to use a power generation method using such hydropower.

Small hydroelectric power generation may have no difference in principle from general large-scale hydroelectric power generation but may be small and technically simple hydroelectric power generation that harmonizes with local regional conditions. In particular, since small hydroelectric power generation generates clean energy without pollution, which has a higher energy density than other alternative energy sources, the small hydroelectric power generation is evaluated as a natural resource with a high development value, and technology development and development support projects thereof are competitively and actively being conducted in many advanced countries.

For such small hydroelectric power generation, there has been a method of collecting wastewater or rainwater discarded from each floor of a building through a single drain pipe, draining the collected wastewater or rainwater using a significant head drop, and installing an electric generator at a lower portion of the drain pipe to generate electricity from the wastewater or rainwater that is collected and falls, or there has been conventionally presented a hydroelectric power generation device or the like which is installed at a middle of a water supply pipe or sewage/waste water pipe isolated from the outside and is suitable for generating power.

Figure 1:
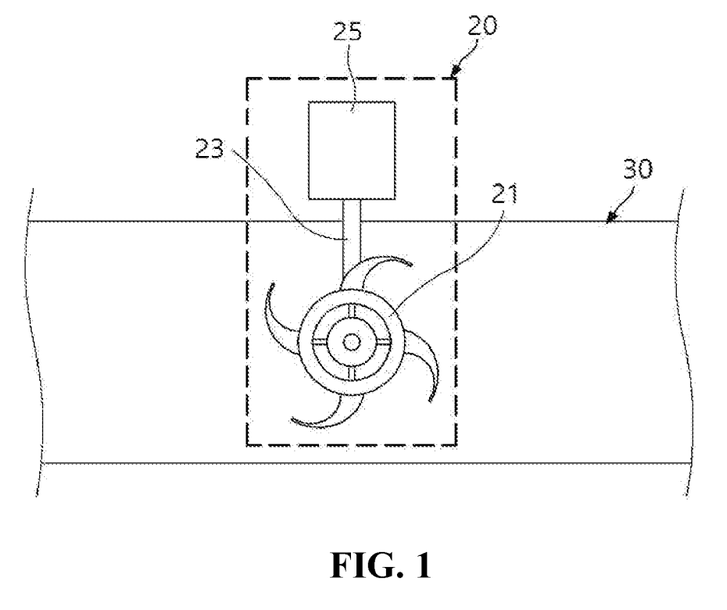
FIG. 1 is a conceptual view for describing a conventional small hydroelectric power generation device.

For example, as shown in FIG. 1, such a small hydroelectric power generation device 20 has a configuration in which a turbine blade 21 rotated according to a flow of a fluid is installed at a central portion inside a pipe 30 through which the fluid flows, a turbine shaft 23 is inserted into the pipe 30 and is connected to the turbine blade 21 to transmit a rotary motion of the turbine blade 21 to a turbine generator 5 disposed outside the pipe 30, and generated power is transmitted to a separate power device.

Examples of such technology are disclosed in Patent Documents 1 to 3 below.

For example, Patent Document 1 (Korean Patent Registration No. 10-1187875, registered on Sep. 26, 2012) discloses a power generation system for a water supply pipe including a rotating module case formed such that water introduced from one side thereof is discharged to the other side thereof, a rotating wheel provided to be rotatable according to a flow of water introduced and discharged into and from the rotating module case, a first magnetic body provided to be rotated along the same rotating axis as the rotating wheel when the rotating wheel provided inside the rotating module case is rotated, a power generation module case detachably provided on the rotary module case, a rotating bracket rotatably provided inside the power generation module case, a second magnetic body provided in the rotating bracket such that the rotating bracket is rotated by a magnetic force of the first magnetic body when the first magnetic body is rotated, and a coil unit provided in the power generation module case to be rotated relative to the second magnetic body to generate induced power.

In addition, Patent Document 2 (Korean Patent Registration No. 10-1465584, registered on Nov. 20, 2014) discloses a pipe-integrated small hydroelectric generator including a rotor which is formed in a cylindrical shape and in which a plurality of blades are installed on an inner surface thereof to generate a rotary motion through a fluid flowing therein, and a plurality of magnetic bodies are installed on an outer surface thereof at regular intervals, a stator which is spaced apart from the rotor to correspond to the rotor and is formed to surround the rotor and on which a plurality of coils corresponding to the plurality of magnetic material bodies are wound to convert an induced electromotive force generated according to rotation of the rotor into electrical energy, and a main support pipe which is a cylindrical pipe formed by distributing or alternating two or more types of materials, is installed between the rotor and the stator to support the rotor and the stator, and has both ends connected to drain pipes through which a fluid flows, wherein the materials include at least one magnetic material and at least one non-conductive material.

Figure 2:
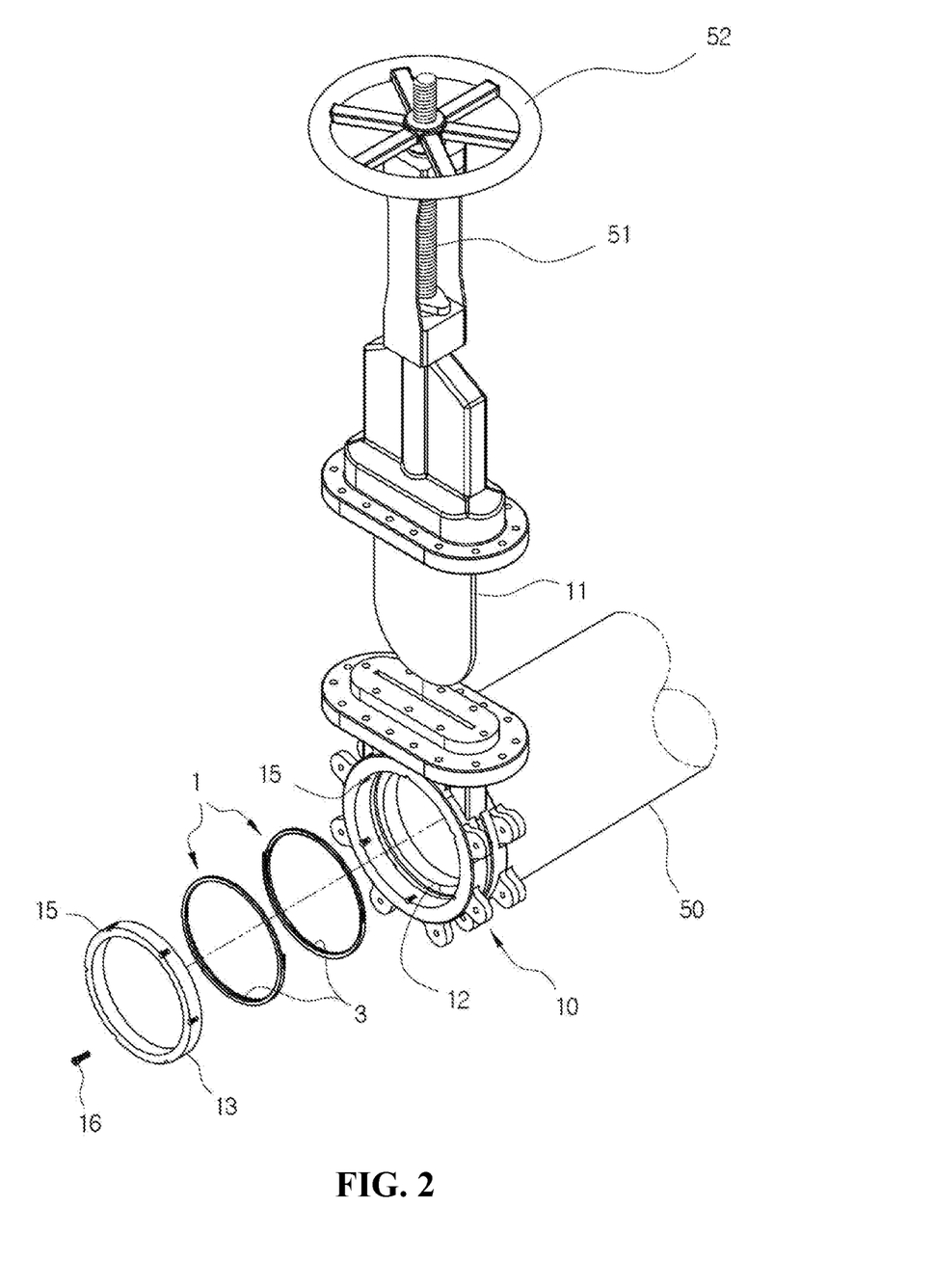
FIG. 2 is a configuration view of a soft seat knife gate valve for controlling a transfer amount.

Meanwhile, as shown in FIG. 2, Patent Document 3 (Korean Patent Registration No. 10-1563464, registered on Oct. 20, 2015) discloses a soft seat knife gate valve in which a packing seating groove 12 is formed at a position at which an opening/closing plate 11 is vertically moved inside a valve body 10 mounted on a transfer pipe 50, one side of the packing seating groove 12 is open so that a packing fixing ring 13 is coupled to the packing seating groove 12 together with an O-ring, a bolt hole 15 is formed in the valve body 10 and the packing fixing ring 13 with respect to a coupling line, the packing fixing ring 13 is installed in the valve body 10 through a bolt 16 so that a packing 1 seated on the packing seating groove 12 is installed to not be separated, and an operation rod 51 is vertically moved by a handle 52 to vertically move the opening/closing plate 11.

DISCLOSURE

Technical Problem

In the technology disclosed in Patent Document 1 as described above, self-generation is performed by installing a power generation system in a plurality of branched water supply pipes of a plurality of water supply facilities, but since a rotating wheel including a blade with a flat plate shape is applied, there is a problem in that hydraulic power according to a flow of water cannot be sufficiently used.

In addition, in the technology disclosed in Patent Document 2, power generation is performed by a rotor having a plurality of blades installed in a drain pipe, but as in Patent Document 1, there is a problem in that hydraulic power according to a flow of water cannot be sufficiently used.

Meanwhile, a structure of a soft seat knife gate valve disclosed in Patent Document 3 is a sealing structure in which an elevating action of an opening/closing plate may be smoothly operated to control or block a transfer amount and is a structure in which an operator directly operates a handle 52 to vertically move an opening/closing plate 11. Thus, when the knife gate valve is installed in a remote place, there is a problem in that it is difficult to control the gate valve.

The present invention is directed to providing a self-powered remote control system for a smart valve, which is capable of automatically controlling a gate valve which is provided at a long distance, of which power is difficult to supply and maintain, and which is mounted on a water and sewage pipe.

The present invention is also directed to providing a self-powered remote control system for a smart valve, which generates self-powered energy using a water flow rate of 1.2 Mpa to 1.4 Mpa in a multipurpose waterway, a reservoir, a water and sewer facility, or a skyscraper system so as to perform wireless communication for data about a temperature, pressure, or flow rate and perform remote control of a valve.

The present invention is also directed to providing a self-powered remote control system for a smart valve, which self-generates power without external power to allow wireless communication and remote control of a valve so as to be applied to an automatic irrigation system of a smart farm.

Technical Solution

According to one embodiment of the present invention, a self-powered remote control system for a smart valve includes a smart valve configured to control a flow of a fluid in a pipe, a sensing module configured to detect a flow rate, pressure, or temperature of the fluid in the pipe, a power generation module configured to generate power according to the flow of the fluid, a control module configured to control lifting or lowering of an opening/closing plate of the smart valve according to a state of the flow rate, pressure, or temperature detected by the sensing module, and an administrator terminal configured to transmit and receive a control signal to and from the control module, wherein the power generation module includes a fluid guide member which has a conical shape and is provided in a supply direction of the fluid, and a rotating member rotated according to the fluid guided to the fluid guide member.

The power generation module may include a first bevel gear rotated in the same direction as rotation of the rotating member, and a second bevel gear engaged with the first bevel gear and rotated in a direction changed from a rotation direction of the first bevel gear, and the sensing module may be provided above the second bevel gear.

The smart valve may be a soft seat gate valve.

A plurality of fluid guide paths may be provided in the conical shape on a surface of the fluid guide member, a plurality of blades may be provided in the rotating member, a connection shaft may be provided on the blades, a driving shaft may be provided below the blades, and the rotating member may be rotatably coupled in the fluid guide member through the connection shaft.

The plurality of fluid guide paths may be formed in a manner that a distance therebetween is gradually increased from an upper portion to a lower portion of the conical shape and may be provided to correspond to the number of the plurality of blades, and the blades may be provided in a direction parallel to the supply direction of the fluid and may be provided to have a curved surface, in which a contact surface with the fluid is gradually decreased from a left side to a right side thereof, so as to be rotatable according to the fluid supplied through the plurality of fluid guide paths.

Advantageous Effects

As described above, according to a self-powered remote control system for a smart valve according to the present invention, by providing a power generation module which generates power using a water flow rate of 1.2 Mpa to 1.4 Mpa in a multipurpose waterway, a reservoir, a water and sewer facility, or a skyscraper system, a smart valve can be controlled remotely.

In addition, a self-powered remote control system for a smart valve according to the present invention can be applied for using agricultural and domestic water in preparation for extreme drought and can be expanded and applied to a sewage treatment plant, a coolant of a power plant, or an air conditioning facility of a skyscraper to generate power, and smart valve control can be easily performed in a remote place through an administrator terminal.

Furthermore, a self-powered remote control system for a smart valve according to the present invention can be applied to an automatic irrigation system of a smart farm so as to automatically supply water for gardening or the like.

MODES OF THE INVENTION

The above-described and other objects and novel features of the present invention will become more apparent from the description of the present specification and the accompanying drawings.

As used herein, the term "smart valve" is a structure of a soft seat gate valve installed at a middle of a pipe as shown in FIG. 2 to control a flow in a flow path and refers to a structure capable of automatically control an opening/closing plate for controlling a flow of a fluid (water) in a pipe applied to garden products of a smart farm, a multipurpose waterway, a reservoir, a pumping station, a coolant of a power plant, a sewage treatment plant, or an air conditioning facility of a skyscraper. A "left side" refers to a direction in which a fluid is supplied into the pipe, and a "right side" refers to a direction in which a fluid is discharged.

In addition, the term "fluid" used in the present invention refers to water used for water and sewage or used as agricultural water, but the present invention is not limited thereto. The fluid may be applied to oil, gas, or the like transported through a pipe.

Hereinafter, embodiments according to the present invention will be described with reference to the drawings.

Figure 3:
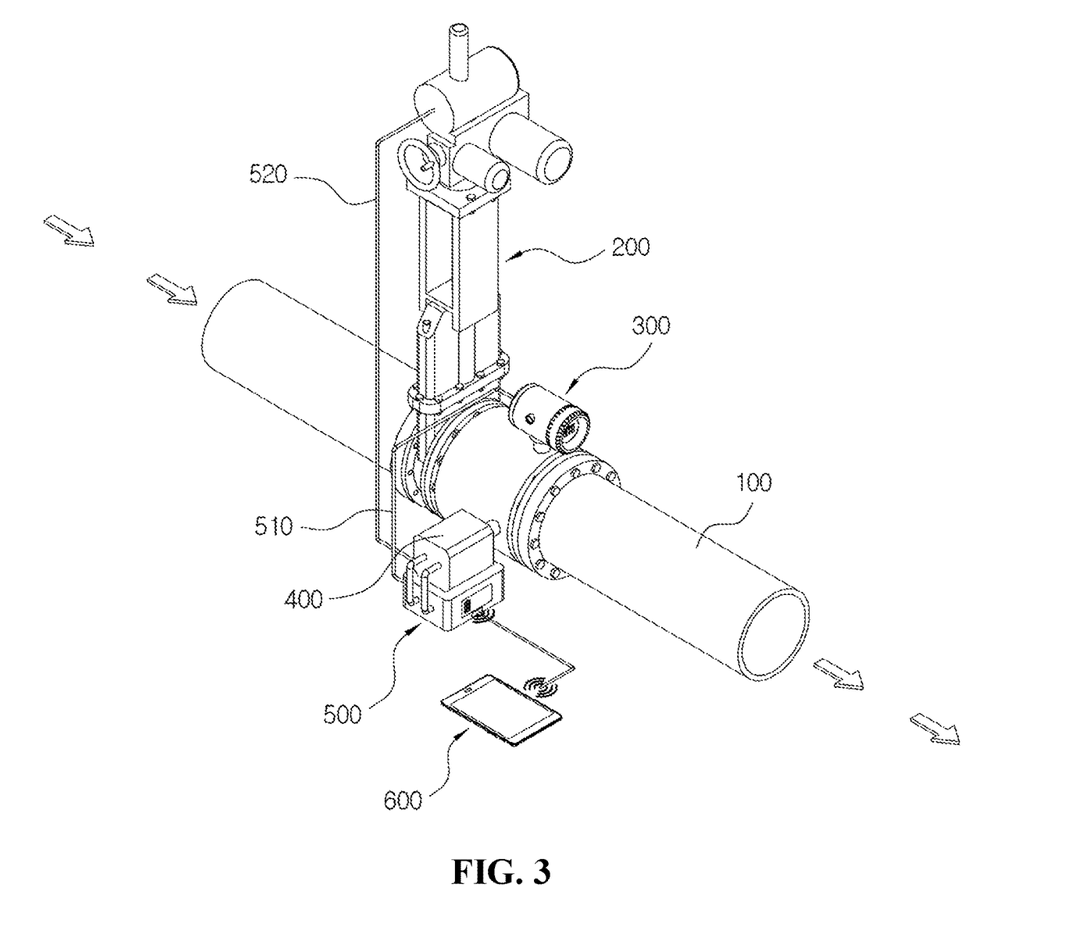
FIG. 3 is a view illustrating a structure of a self-powered remote control system for a smart valve according to the present invention.
Figure 4:
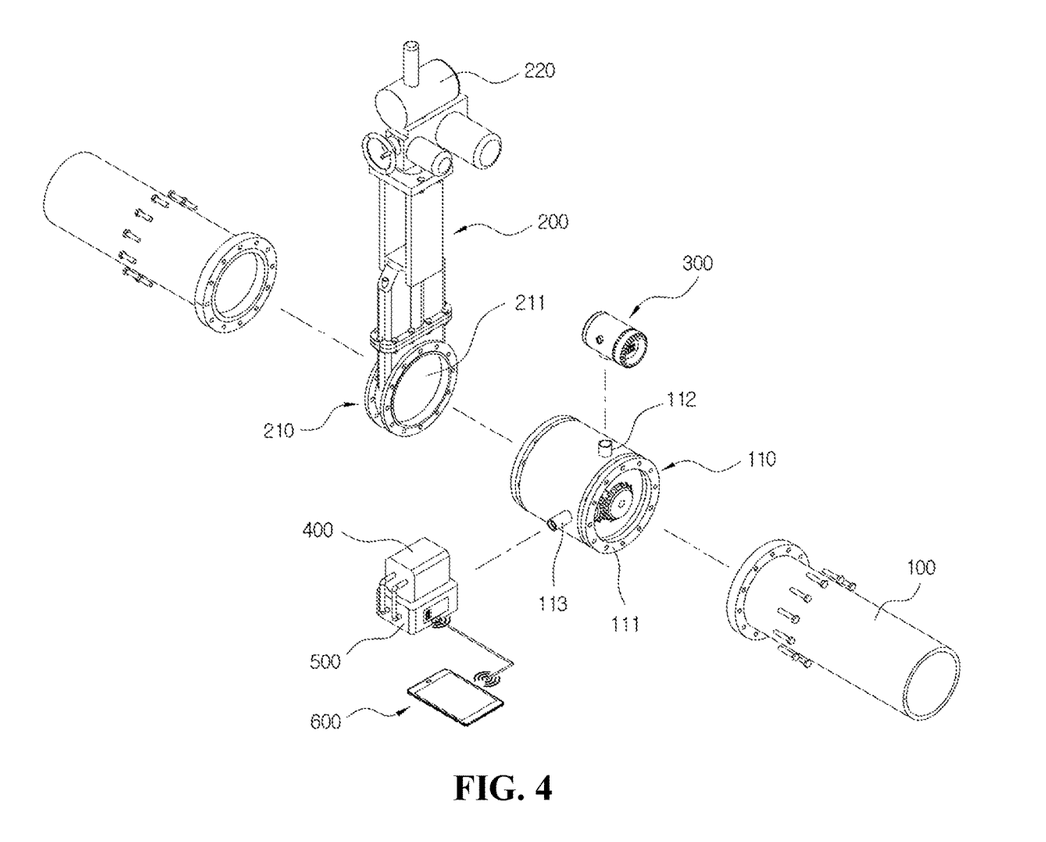
FIG. 4 is an exploded perspective view of the self-powered remote control system for a smart valve shown in FIG. 3.

FIG. 3 is a view illustrating a structure of a self-powered remote control system for a smart valve according to the present invention, and FIG. 4 is an exploded perspective view of the self-powered remote control system for a smart valve shown in FIG. 3.

As shown in FIGS. 3 and 4, the self-powered remote control system for a smart valve includes a smart valve 200 which controls a flow of a fluid in a pipe 100, a sensing module 300 which detects a flow rate, pressure, or temperature of the fluid in the pipe 100, a power generation module 400 which generates power according to the flow of the fluid, a control module 500 which controls lifting or lowering of an opening/closing plate of the smart valve according to a state of the flow rate, pressure, or temperature detected by the sensing module, and an administrator terminal 600 which transmits and receives control signals to and from the control module 500.

The pipe 100 is a pipe used for garden products of a smart farm, a multipurpose waterway, a reservoir, a pumping station, a coolant of a power plant, a sewage treatment plant, or an air conditioning facility of a skyscraper and is used to supply a fluid (water). As shown in FIG. 4, the pipe 100 may be a system connection pipe and may be used by connecting a plurality of pipes through pipe connection members 110 having valve faces. Such a pipe 100 may be made of a metal material or high-strength plastic which is a common pipe material.

The pipe connection member 110 has the same inner diameter as the pipe 100 and may be integrated with the pipe 100 at each end face 111 thereof through a coupling mechanism such as a bolt. A sensing member for the sensing module 300 and a power generation member for the power generation module 400 are embedded in the pipe connection member 110, and a first through-hole 112 for communication with the sensing module 300 and a second through-hole 113 for communication with the power generation module 400 are formed in the pipe connection member 110. The first through-hole 112 is formed for inserting the sensing member and is sealed to prevent a leakage, and the second through-hole 113 is provided with a bearing or the like to transmit a rotational force of the power generation member and is sealed to prevent a leakage.

Meanwhile, although the pipes 100 are shown in FIGS. 3 and 4 as being connected through a structure in which the pipe connection member 110 is applied to embed the smart valve 200 and the power generation module 400, but the pipes 100 may be directly connected and used.

Figure 5:
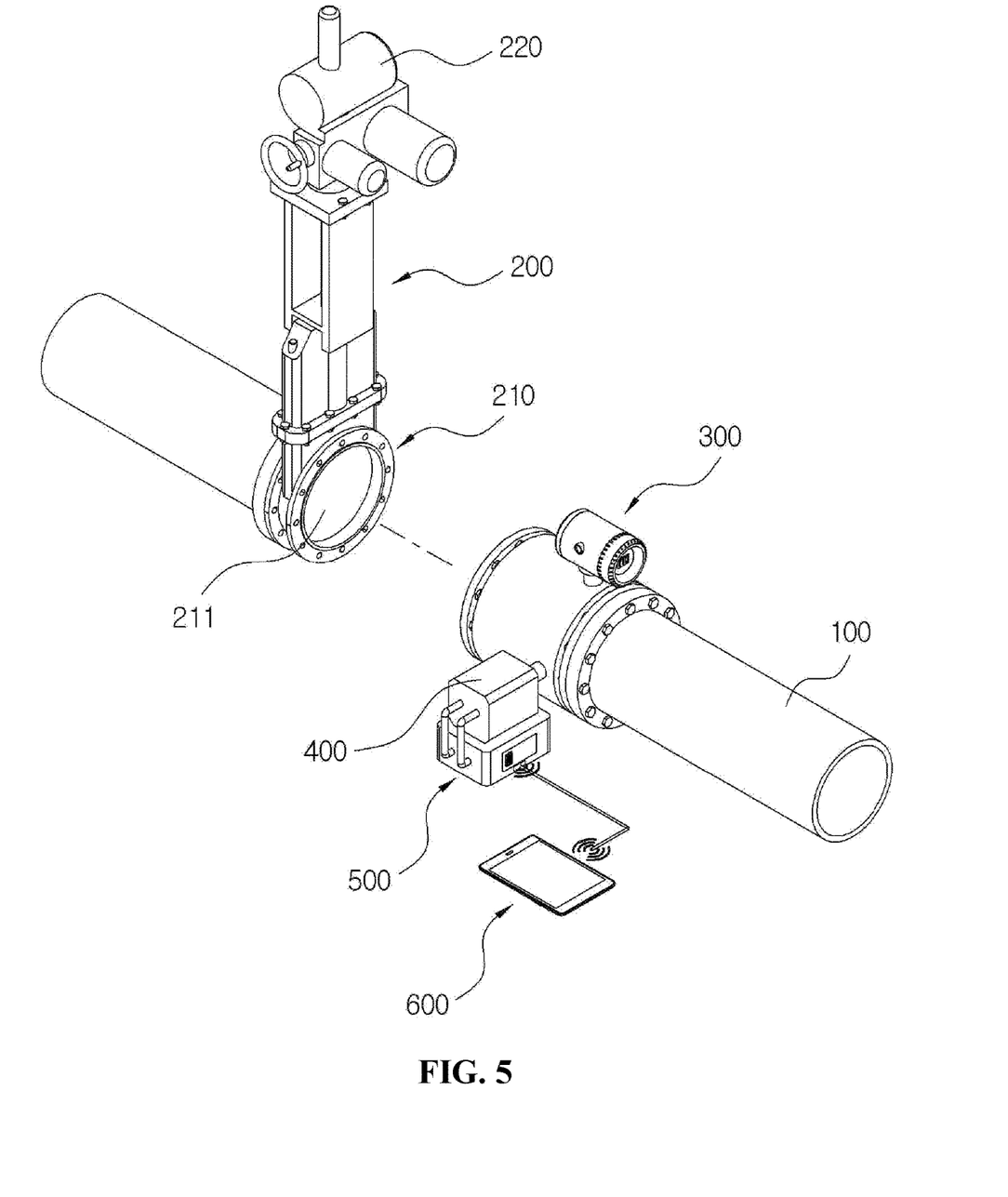
FIGS. 5 and 6 are views illustrating an operating state of an opening/closing plate in a smart valve.
Figure 6:
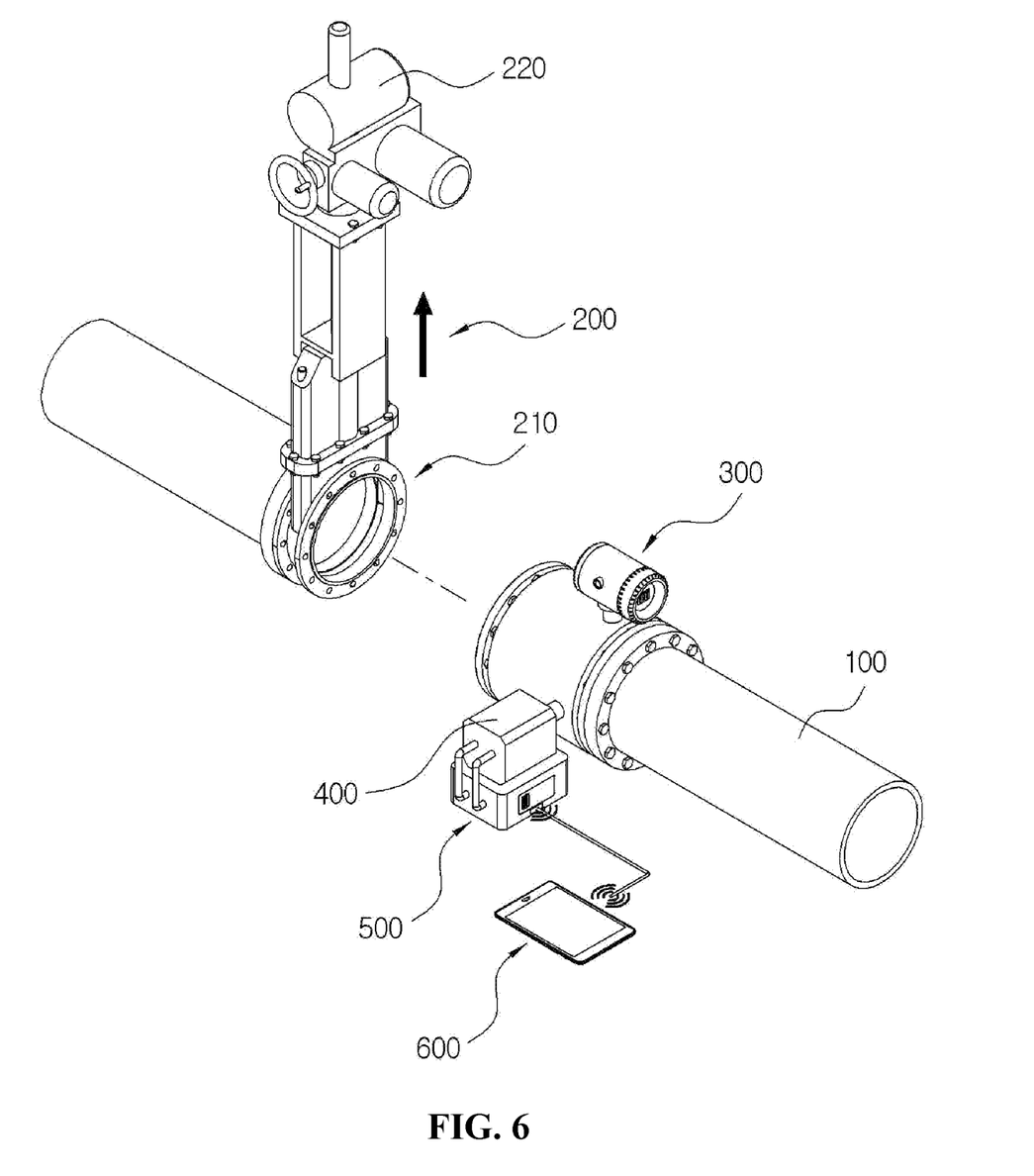

As the smart valve 200, for example, a soft seat gate valve as shown in FIG. 2 may be applied. As shown in FIG. 4, the smart valve 200 includes a valve body 210 and a shaft and motor 220 which is for vertically moving an opening/closing plate 211 provided in the valve body 210, and the valve body 210 is mounted between the pipe connection member 110 and the pipe 100. The motor 220 is provided to be rotatable forward or reverse by the control module 500 and rotates the shaft to vertically move the opening/closing plate 211, thereby controlling a flow of a fluid in the pipe 100 as shown in FIGS. 5 and 6. FIG. 5 is a view illustrating an operating state of the opening/closing plate in the smart valve and illustrating a state in which the opening/closing plate 211 is lowered to close a flow path in the pipe 100, and FIG. 6 is a view illustrating a state in which the opening/closing plate 211 is lifted according to the operation of the motor 220 in the smart valve to open the flow path in the pipe 100.

Therefore, when the self-powered remote control system for a smart valve according to the present invention is applied in, for example, supplying water for garden products of a smart farm, water can be supplied to the garden products only for a predetermined time.

In addition, according to the smart valve 200 according to the present invention, as shown in FIG. 2, a conventional gate valve (with a diameter of 300 mm) has a face-to-face distance of 400 mm, but the smart valve 200 according to the present invention has a face-to face distance of 76 mm (which is reduced by 324 mm). Thus, fluid sludge is prevented from being deposited on a lower portion of the valve is prevented, and there is no valve leakage. In addition, the smart valve 200 is provided to have a structure capable of controlling a flow rate of water resources, and thus, it is possible to primarily seal a valve disc through a soft seat and secondarily block a leakage through a metal. That is, in the conventional gate valve, due to a wide face-to-face distance of 400 mm, fluid vortex is generated to cause friction at a lower portion of a disc, a rubber lining is separated, and a leakage is caused, and due to a wedge-shaped disc structure, a lower rubber lining of the disc is torn, a leakage is caused, and flow rate adjustment is not possible. However, the smart valve 200 according to the present invention can solve the above-described problems.

The sensing module 300 is provided to have a structure capable of performing display by a temperature sensor, a flow rate sensor, and a pressure sensor being provided integrally. As shown in FIG. 4, the sensing module 300 is provided above the power generation member in the pipe connection member 110 through the first through-hole 112. Accordingly, a flow rate, pressure, temperature, and the like of a fluid flowing in the pipe 100 may be simultaneously detected and displayed and may be transmitted to the administrator terminal 600 in a remote place through the control module 500.

The power generation module 400 will be described in detail with reference to FIGS. 7 and 8.

Figure 7:
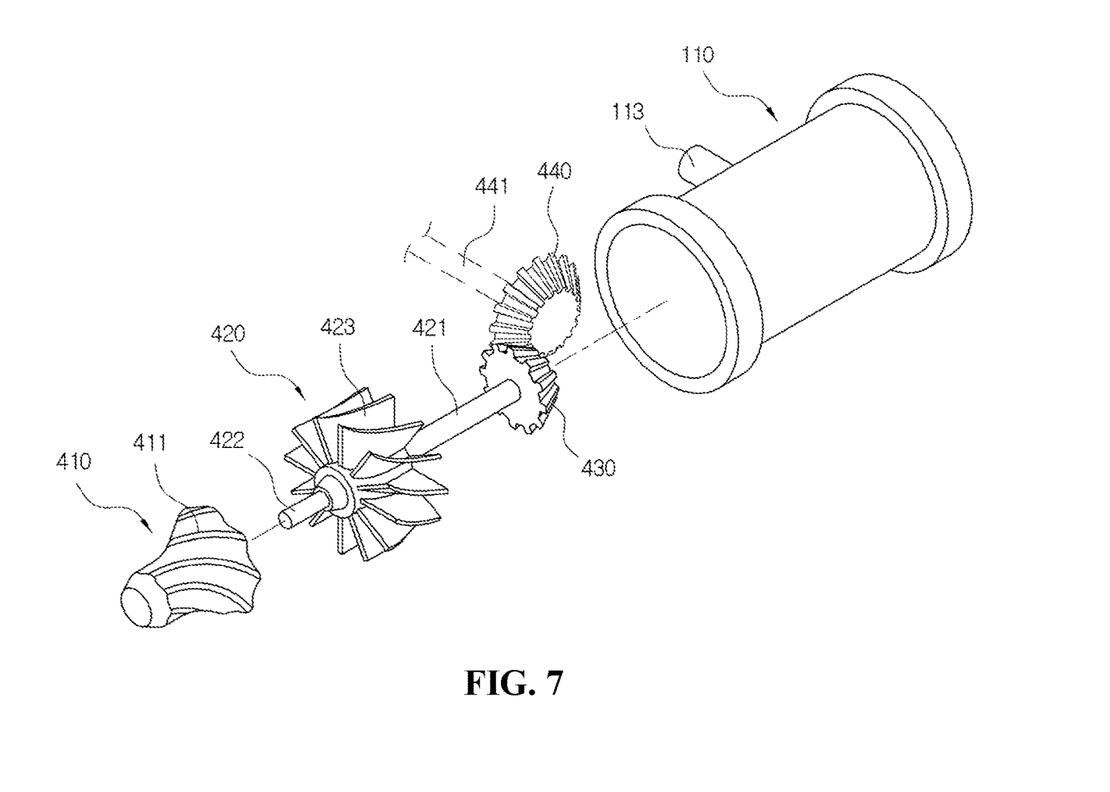
FIG. 7 is an exploded perspective view of a power generation module provided in a pipe.
Figure 8:
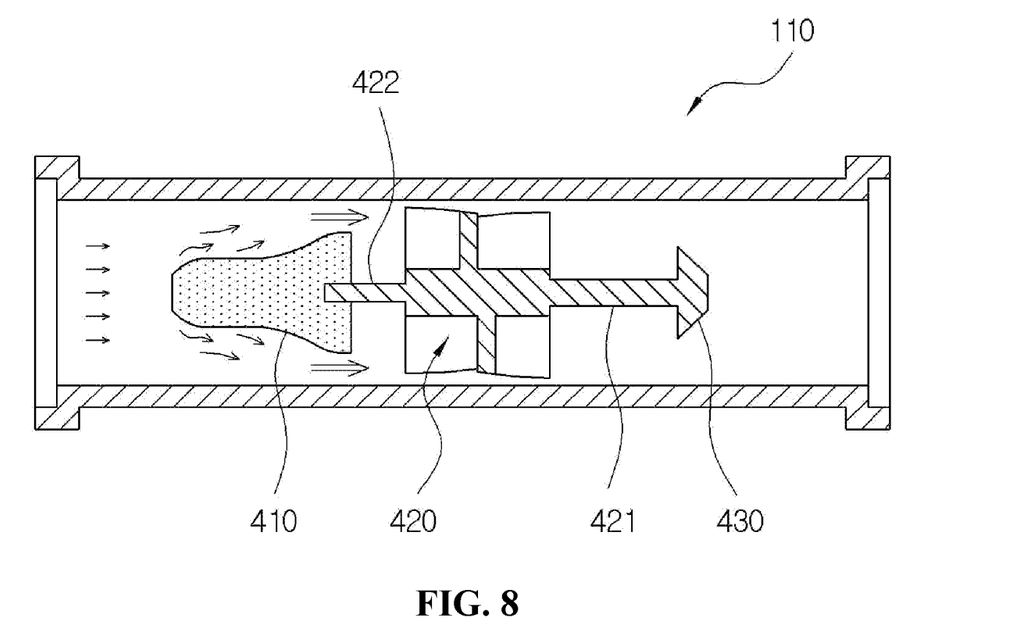
FIG. 8 is a schematic view for describing guidance of a moving fluid in the power generation module shown in FIG. 7.

FIG. 7 is an exploded perspective view of the power generation module provided in the pipe connection member, and FIG. 8 is a schematic view for describing guidance of a moving fluid in the power generation module shown in FIG. 7.

As shown in FIGS. 3 and 7, as the power generation member, the power generation module 400 includes a fluid guide member 410 which has a conical shape and is provided in a supply direction of a fluid, a rotating member 420 rotated according to a fluid guided to the fluid guide member 410, a first bevel gear 430 rotated in the same direction as the rotation of the rotating member 420, and a second bevel gear 440 engaged with the first bevel gear 430 and rotated in a direction changed from a rotation direction of the first bevel gear 430. The fluid guide member 410, the rotating member 420, the first bevel gear 430, and the second bevel gear 440 may be made of a metal material or high-strength plastic.

As shown in FIG. 7, a plurality of fluid guide paths 411 are provided in a conical shape on a surface of the fluid guide member 410. A plurality of blades 423 are provided in the rotating member 420, a connection shaft 422 is provided on the blades, and a driving shaft 421 is provided below the blades. That is, the driving shaft 421, the connection shaft 422, the plurality of blades 423, and the first bevel gear 430 are provided integrally. Accordingly, a rotational force corresponding to the rotation of the plurality of blades 423 is applied to the first bevel gear 430.

The rotating member 420 is rotatably coupled to the fluid guide member 410 through the connection shaft 422. To this end, a rotation guide member such as a bearing may be provided inside the fluid guide member 410. Accordingly, the fluid guide member 410 may be fixedly mounted in the pipe connection member 110. As shown in FIG. 8, the fluid guide member 410 may be provided in the conical shape to accelerate a flow speed of a fluid flowing in the fluid guide path 411 according to the Bernoulli's principle, thereby accelerating a rotational speed of the blade 423. As shown in FIG. 7, the plurality of fluid guide paths 411 may be formed in a manner that a distance therebetween is gradually increased from an upper portion to a lower portion of the conical shape and may be provided to correspond to the number of the plurality of blades 423.

As shown in FIG. 7, each blade 423 is provided in a direction parallel to a supply direction of a fluid. The blades 423 are provided to have a curved surface, in which a contact surface with a fluid is gradually decreased from a left side to a right side thereof, so as to be rotatable according to a fluid supplied through the plurality of fluid guide paths 411. Accordingly, a fluid accelerated by the fluid guide member 410 may be applied to a surface of the blade in contact with a fluid supplied to the pipe 100, thereby accelerating a rotational speed of the blade.

The first bevel gear 430 is provided at an end portion of the driving shaft 421 formed integrally with the blade and is rotated in the same direction as the rotation of the rotating member 420. A rotational force of the second bevel gear 440 rotated by being engaged with the first bevel gear 430 may be transmitted to an electric generator provided outside the pipe connection member 110 through a power generation shaft 441 inserted into the second through-hole 113 so as to generate electricity. The electricity generated by the electric generator may be stored in a charger.

The power generation module 400 as described above may be provided to generate a self-power of 6 kW or more, thereby driving the smart valve 200, performing remote controlling and monitoring at a distance of 10 km or more, and driving the sensing module 300 for detecting a temperature, humidity, and a flow rate.

The control module 500 includes a detection line 510 electrically connected to the sensing module 300 so as to transmit information detected by the sensing module 300 to the administrator terminal 600 and a motor line 520 electrically connected to the motor 220 of the smart valve 200 so as to control the operation of the smart valve 200 according to a control command transmitted from the administrator terminal 600. In addition, the control module 500 includes a communication unit, a storage unit, and a control unit therein.

For the remote controlling and monitoring at a distance of 10 km or more, the communication unit may include an antenna for wireless communication with the administrator terminal 600. The communication unit may execute any one wireless communication method of a long range (LoRa) method, a narrowband Internet of Things (NB-IoT) method, an ultra narrowband (UNB) modulation method, a wireless smart utility network (Wi-SUN) method, a ZigBee method, an industry-science-medical (ISM) band method, a radio frequency (RF) communication method, and a Bluetooth (BLE) method and thus transmit information detected by the sensing module 300 to the administrator terminal 600 or receive a control signal of the smart valve 200 from the administrator terminal 600 in a certain period. In addition, a repeater for long-distance communication may be provided in the control module 500.

The storage unit stores information about a flow rate, pressure, or temperature of a fluid detected by the sensing module 300, control information transmitted from the administrator terminal 600, various user interfaces, and the like and stores data and programs necessary for the control module 500 to operate. In addition, the storage unit may store instructions for a plurality of application programs or a plurality of applications driven by the control module 500. In addition, at least some of the application programs (applications) may be downloaded from the administrator terminal 600. To this end, the storage unit 202 may include at least one storage medium of a flash memory type memory, a hard disk type memory, a multimedia card micro-type memory, a card-type memory (for example, a secure digital (SD) or extreme digital (XD) memory), a random access memory (RAM), a static random access memory (SRAM), a read-only memory (ROM), an electrically erasable programmable read-only memory (EEPROM), and a programmable read-only memory (PROM).

The display unit may display charge state information of a battery and state information detected by the sensing module 300 and may be provided as any one of a liquid crystal display (LCD), a thin film transistor liquid crystal display (TFT LCD), an organic light-emitting diode (OLED), and a flexible display.

The control unit includes a microprocessor, transmits information detected by the sensing module 300 to the administrator terminal 600, and controls the operation of the motor 220 of the smart valve 200 according to a control command transmitted from the administrator terminal 600.

The administrator terminal 600 may have a communication function capable of performing data communication with the control module 500 through a network and may include various terminals such as a smartphone, a portable terminal, a mobile terminal, a personal digital assistant (PDA), a portable multimedia player (PMP) terminal, a telematics terminal, a navigation terminal, a personal computer (PC), a notebook computer, a slate PC, a tablet PC, an ultrabook, a wearable device (including, for example, a watch-type terminal (smartwatch), a glass-type terminal (smart glass), a head mounted display (HMD), or the like), a WiBro terminal, an internet protocol television (IPTV) terminal, a smart television (TV), a digital broadcasting terminal, an audio-video-navigation (AVN) terminal, an audio/video (A/V) system, and a flexible terminal.

Figure 9:
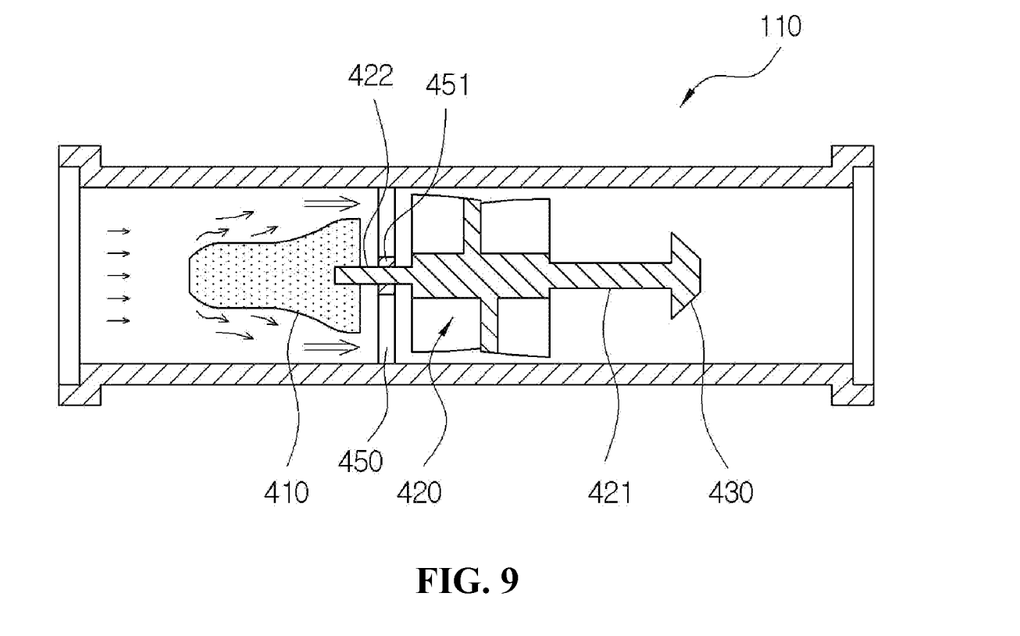
FIGS. 9 and 10 are views illustrating other examples of a power generation member provided in a pipe.
Figure 10:
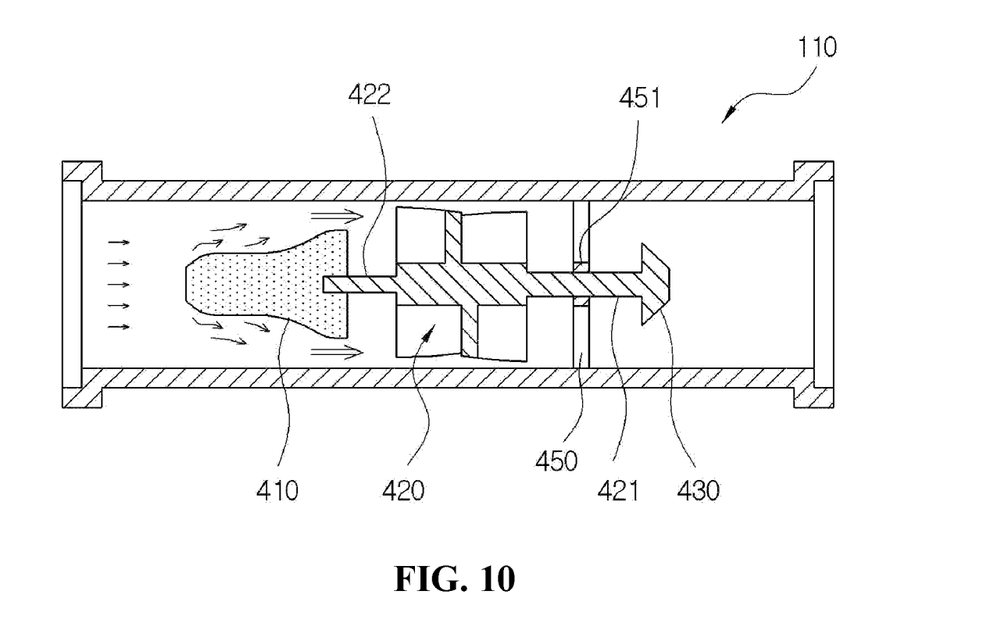

In addition, in the above description, the fluid guide member 410 has been described as having a structure fixedly mounted in the pipe connection member 110, but as shown in FIGS. 9 and 10, the fluid guide member 410 may be provided to have a structure fixed to the connection shaft 422 of the rotating member 420.

FIGS. 9 and 10 are views illustrating other examples of a power generation member provided in a pipe.

That is, as shown in FIG. 9, a support member 450 is provided to maintain a state in which a fluid guide member 410 is fitted onto a connection shaft 422 of a rotating member 420, and thus, a fluid flowing through a fluid guide path 411 is applied directly to a blade 423, thereby increasing a rotational force of the rotating member 420. The fluid guide member 410 and the rotating member 420 are maintained in a pipe connection member 110 by the support member 450 provided at an approximately central portion of the connection shaft 422. In addition, a bearing 451 is provided at a central portion of the support member 450 so as to not interrupt the rotation of the connection shaft 422.

Meanwhile, although FIG. 9 shows a structure in which the support member 450 is provided at the connection shaft 422, as shown in FIG. 10, a structure in which the support member 450 is provided at an approximately central portion of a driving shaft 421 may be applied. Even in the support member 450 shown in FIG. 10, a bearing 451 is provided so as to not interrupt the rotation of the driving shaft 421.

As shown in FIGS. 9 and 10, since the support member 450 is provided, the fluid guide member 410 and the rotating member 420 may be stably rotated by maintaining a center of mass in the pipe connection member 110.

Next, the operation of the self-powered remote control system for a smart valve according to the present invention will be described.

As shown in FIG. 3, the pipe 100 and the pipe connection member 110 are coupled, wherein the pipe 100 is used for garden products of a smart farm, a multipurpose waterway, a reservoir, a pumping station, a coolant of a power plant, a sewage treatment plant, or an air conditioning facility of a skyscraper, and the pipe connection member 110 is in a state in which the smart valve 200, the sensing module 300, and the power generation module 400 are provided.

Thereafter, when a fluid is supplied into the pipe 100 in a state in which the opening/closing plate 211 of the smart valve 200 is opened, the fluid passes through the plurality of fluid guide paths 411 of the fluid guide member 410 having a conical shape and is supplied to the plurality of blades 423 provided in the rotating member 420, thereby rotating the rotating member 420. The first bevel gear 430 is rotated according to the rotation of the rotating member 420, and the second bevel gear 440 rotated by being engaged with the first bevel gear 430 is rotated to rotate the power generation shaft 441. Thus, electricity is generated by the power generator and charges the charger.

Meanwhile, information about a temperature, a flow rate, and pressure of the fluid detected by the sensing module 300 according to the flow of the fluid is transmitted to the control module 500 through the detection line 510, and the detected information is transmitted to the administrator terminal 600.

In addition, when information for blocking the supply of fluid is transmitted to the control module 500 through the administrator terminal 600, the control module 500 operates the motor 220 of the smart valve 200 using power generated by the power generation module 400 to lower the opening/closing plate 211 as shown in FIG. 5 to block the supply of the fluid. Thereafter, when the supply of the fluid is required, as shown in FIG. 6, the opening/closing plate 211 is lifted to supply the fluid, and concurrently, the power generation module 400 generates power.

As described above, in the self-powered remote control system for a smart valve according to the present invention, the administrator terminal 600 is operated in a remote place so that the operation of the smart valve 200 is controlled to supply or block the fluid in the pipe 100.

The present invention made by the inventor has been described so far in details based on the embodiments, but the present invention is not limited to the embodiments. Various modifications are available without departing from the scope of the present invention.

That is, in the above description, the power generation module 400 is provided to provide self-generation by a fluid flowing in the pipe 100, but the present invention is not limited thereto. When the smart valve is provided outdoors, solar energy generation may be added and applied to the above-described self-generation.

In addition, in the above description, power generation and control of the smart valve according to the supply of water have been described in garden products of a smart farm, a multipurpose dam waterway, or a power generation field, but the present invention is not limited thereto. The fluid may be applied to oil, gas, or the like.

INDUSTRIAL APPLICABILITY

By using a self-powered remote control system for a smart valve according to the present invention, an administrator terminal is operated in a remote place so that the operation of a smart valve is controlled to supply or block a fluid in a pipe.

The invention claimed is:

1. A self-powered remote control system for a smart valve, comprising:
   a smart valve configured to control a flow of a fluid in a pipe;
   a sensing module configured to detect a flow rate, pressure, or temperature of the fluid in the pipe;
   a power generation module configured to generate power according to the flow of the fluid;
   a control module configured to control lifting or lowering of an opening/closing plate of the smart valve according to a state of the flow rate, pressure, or temperature detected by the sensing module; and
   an administrator terminal configured to transmit and receive a control signal to and from the control module,
   wherein the power generation module includes:
   a fluid guide member which has a conical shape and is provided in a supply direction of the fluid; and
   a rotating member rotated according to the fluid guided to the fluid guide member,
   wherein:
   a plurality of fluid guide paths are provided in the conical shape on a surface of the fluid guide member;
   a plurality of blades are provided in the rotating member;
   a connection shaft is provided on the blades;
   a driving shaft is provided below the blades;
   the rotating member is rotatably coupled to the fluid guide member through the connection shaft,
   the plurality of fluid guide paths are formed in a manner that a distance therebetween is gradually increased from an upper portion to a lower portion of the conical shape and are provided to correspond to the number of the plurality of blades; and
   a first portion of each of the blades, which corresponds to the lower portion of the conical shape of the fluid guide paths, is curved, and a second portion of each of the blades is provided in a direction parallel to the supply direction of the fluid, in which a contact surface with the fluid is gradually decreased from the first portion to the second portion, so as to be rotatable according to the fluid supplied through the plurality of fluid guide paths.

2. The self-powered remote control system of claim 1, wherein:
the power generation module includes a first bevel gear rotated in the same direction as rotation of the rotating member, and a second bevel gear engaged with the first bevel gear and rotated in a direction changed from a rotation direction of the first bevel gear; and
the sensing module is provided above the second bevel gear.

3. The self-powered remote control system of claim 1, wherein the smart valve is a soft seat gate valve.

* * * * *